April 29, 1958     G. E. PLAAS     2,832,582
WEIGHING SCALE

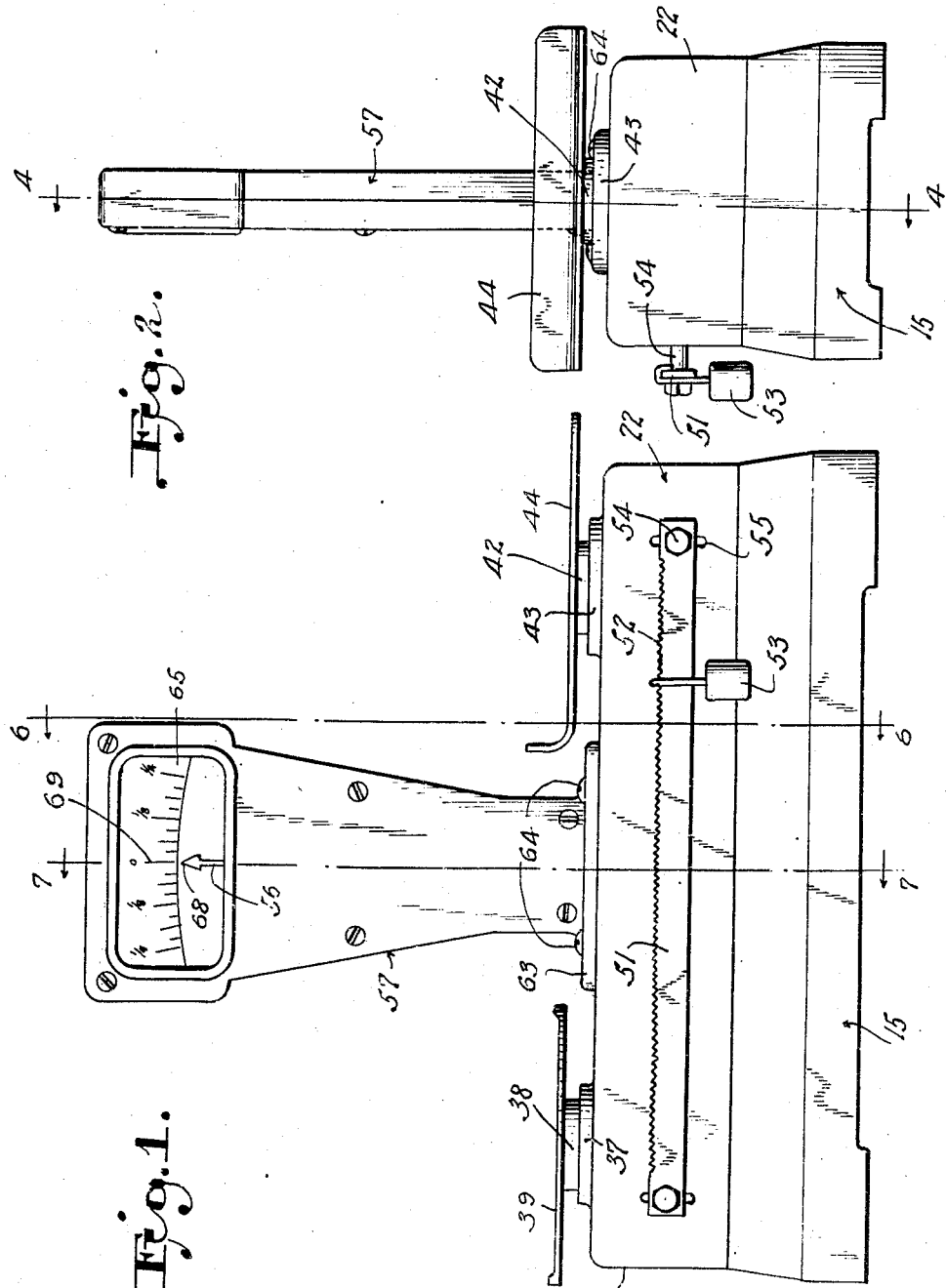

Filed April 10, 1957     5 Sheets-Sheet 2

George E. Plaas
INVENTOR

BY *C. A. Snow & Co.*
ATTORNEYS.

April 29, 1958

G. E. PLAAS 2,832,582

WEIGHING SCALE

Filed April 10, 1957

George E. Plaas
INVENTOR

BY CA Snow Heo.
ATTORNEYS.

2,832,582

WEIGHING SCALE

George E. Plaas, Tucson, Ariz.

Application April 10, 1957, Serial No. 651,928

3 Claims. (Cl. 265—54)

This invention relates to a weighing scale.

An object of this invention is to provide a weighing scale embodying a balance beam with a weight platter at one end and a commodity platter at the other end and with a pointer connected with the beam for indicating over weight or under weight of the commodity.

Another object of this invention is to provide in a weighing scale of the balance type, a dashpot for arresting movement of the balance beam.

A further object of this invention is to provide in a balance scale means for multiplying movement of the beam so that a slight over or under weight will produce a visible movement in the pointer.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a detail front elevation of a weighing scale constructed according to an embodiment of this invention.

Fig. 2 is a detail end elevation of the scale.

Fig. 4 is a sectional view taken on line 4—4 of Fig. 2 as viewed in the direction indicated by the arrows.

Fig. 9 is a fragmentary vertical section taken substantially on line 9—9 of Fig. 5.

Figure 3:
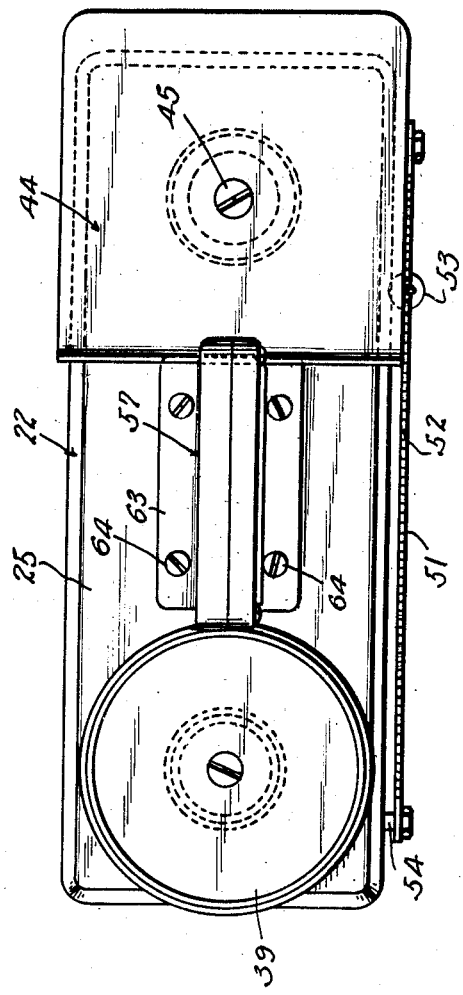
Fig. 3 is a top plan view of the scale.
Figure 5:
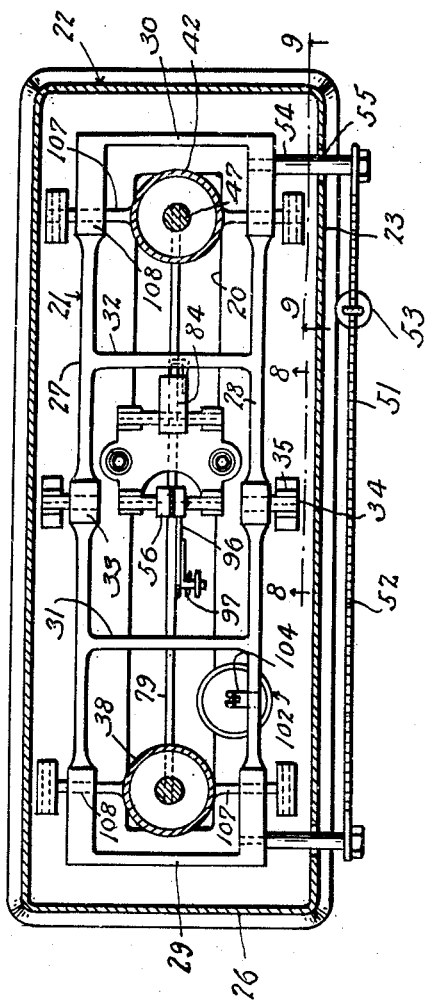
Fig. 5 is a sectional view taken substantially along the line 5—5 of Fig. 4 as viewed in the direction indicated by the arrows.

Referring to the drawings, the numeral 15 designates generally a base structure which includes a horizontal plate or bottom member 16 having downturned front and rear flanges 17 and 18, respectively, and end flanges 19. The base 16 is provided with a downward offset channel 20 disposed in the transverse rim thereof and terminating inwardly from the offset ends, the purpose for which will be hereinafter described. A balancing beam generally indicated at 21 is disposed above the base 15 and is positioned in a housing generally indicated at 22. The housing 22 includes front and rear walls 23 and 24 respectively, a top wall 25 and opposite end walls 26. The balancing beam 21 is formed of spaced apart parallel bars 27 and 28, which are connected together at their opposite ends by means of connecting bars 29 and 30.

Figure 6:
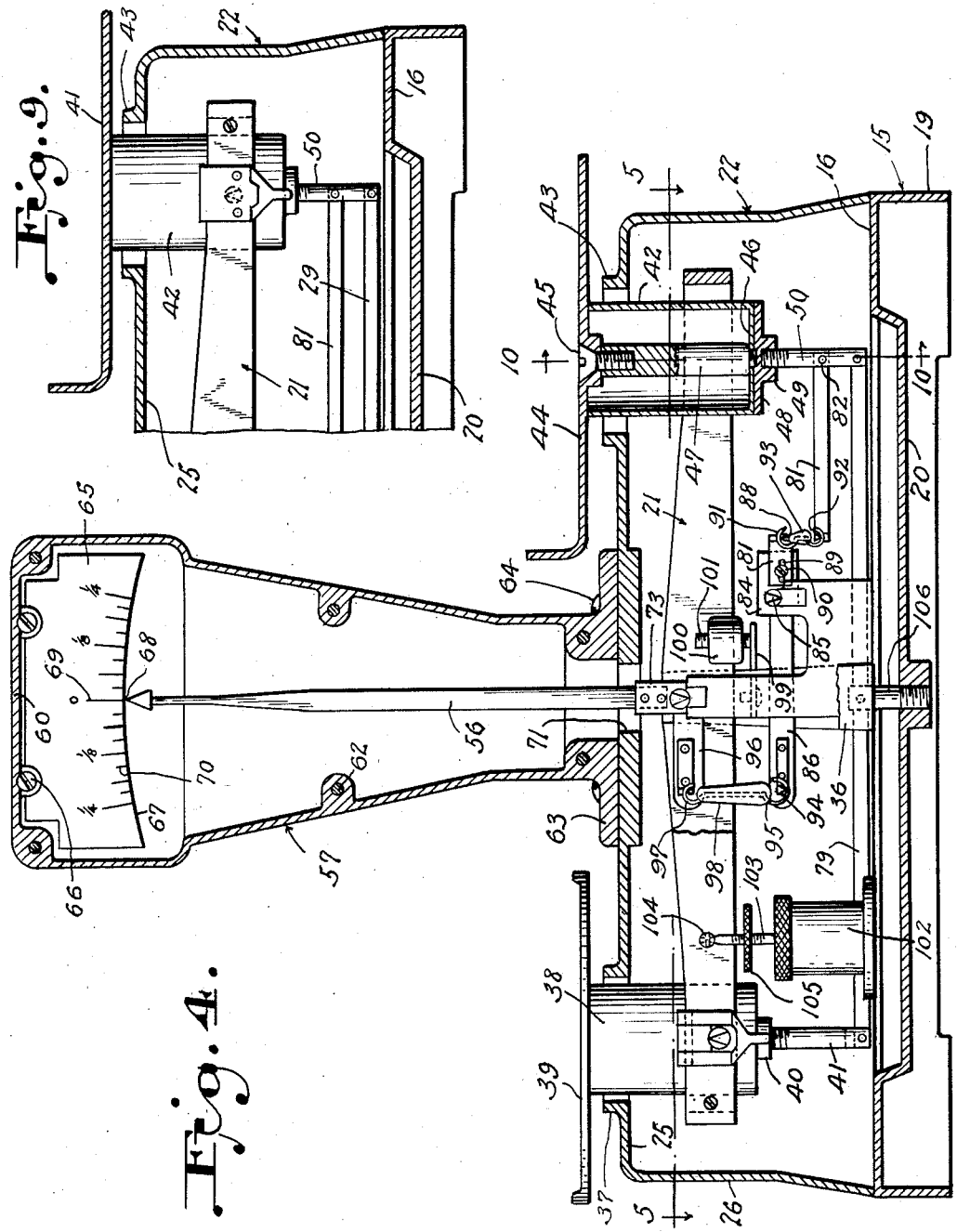
Fig. 6 is a sectional view taken on line 6—6 of Fig. 1.
Figure 7:
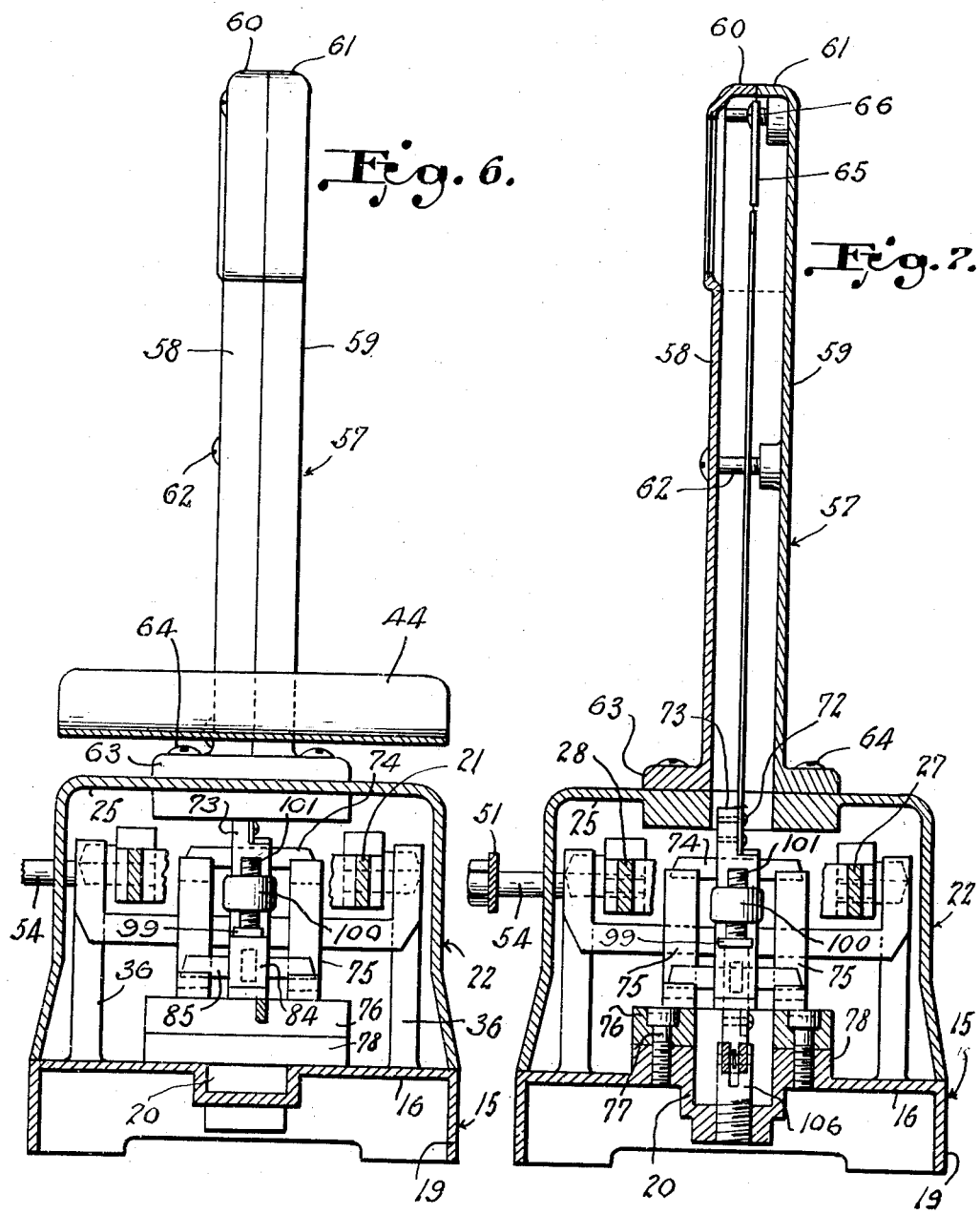
Fig. 7 is a sectional view taken on line 7—7 of Fig. 1.
Figure 8:
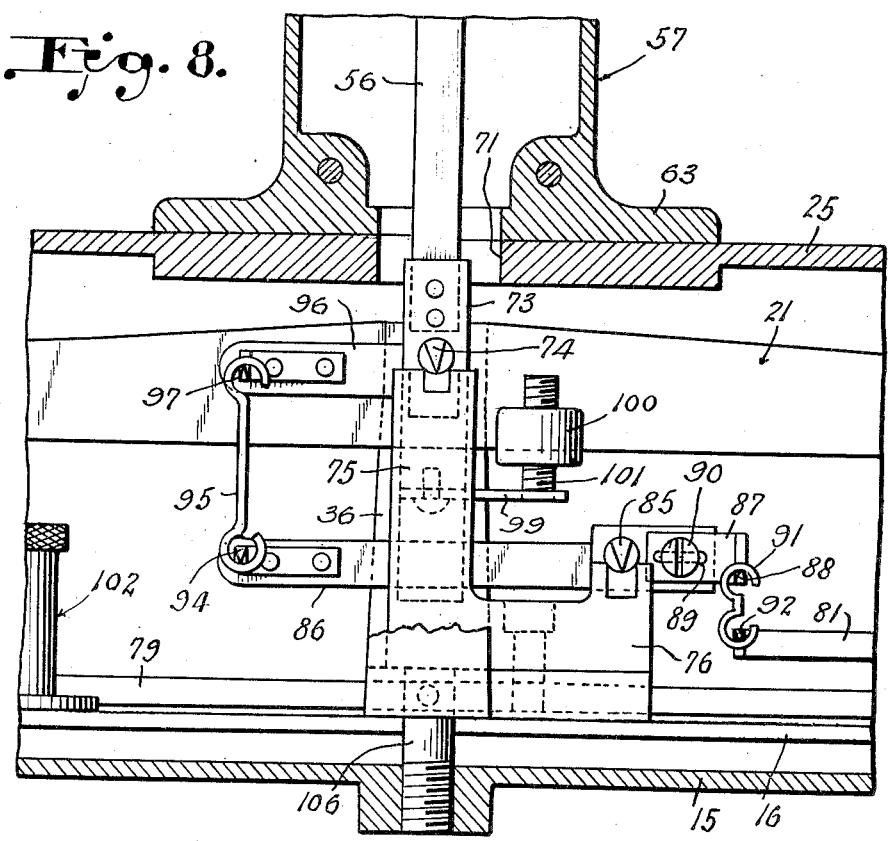
Fig. 8 is a fragmentary vertical section on an enlarged scale taken on line 8—8 of Fig. 5.
Figure 10:
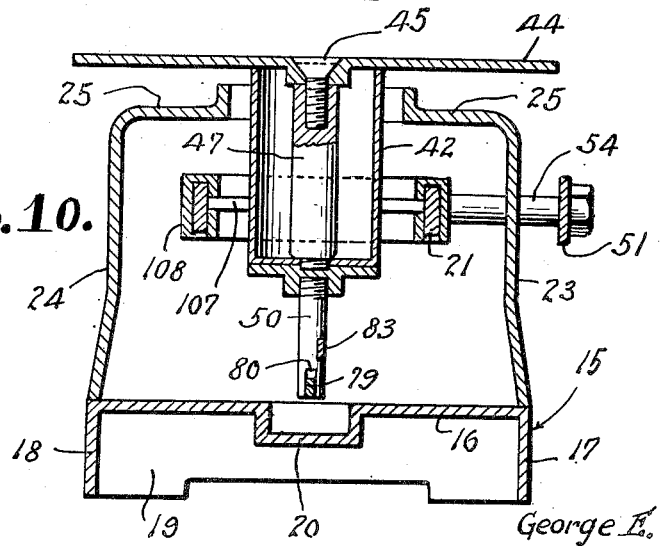
Fig. 10 is a fragmentary transverse section taken on line 10—10 of Fig. 4.

The bars 27 and 28 are also connected together by an intermediate pair of connecting bars 31 and 32. The beam 21 is provided midway between the ends thereof with a pair of bosses 33 which have a pair of pivot studs 34 extending outwardly therefrom. These pivot studs 34 are of triangular configuration in transverse section with the apex thereof extending downwardly and the apex of each pivot member 34 engaging in a bearing 35, carried by the upper end of the standard 36. The standard 36 rises from the plate 16, as shown in Figs. 6 and 7. The top wall 25 of housing 22 is provided adjacent one end thereof with an annular boss 37 and a cylindrical weight platform carrier 38 loosely engages through the boss 37. A weight platform 39 is disposed on the upper end of the support 38 and overlies the top wall 25. The weight platform carried on support 38 has a boss 40 extending downwardly from the bottom wall thereof and a vertical stud 41 is threaded into the boss 40.

A commodity platform carrier 42 is disposed adjacent the other end of the housing 22 and loosely engages through an annular boss 43 formed in the top wall 25. A commodity platform 44 is fixed by fastening means 45 relative to the carrier 42 and the carrier 42 includes a bottom wall 46 which has threaded thereinto a centrally disposed bolt 47. The bolt 47 extends upwardly in the support 42 and screw or fastening member 45 is threaded into the upper end of the bolt 47. A plate 48 is fixed to the bottom wall 46 and is formed with a boss 49. A vertically disposed stud 50 is threaded into the boss 49 and extends downwardly therefrom. The two studs 41 and 50 are adapted upon downward movement of either weight platform 38 or commodity platform 44 to alternately move downwardly into the channel 20.

A tare beam or bar 51 is disposed on the outer side of the housing 22 and the beam 51 is provided with notches 52 in the outer edge thereof with which an adjustable poise member or weight 53 is adapted to engage. The opposite ends of the beam 51 are fixed relative to the beam 21 by means of a pair of bolts 54 which extend through vertical slots 55 formed in the front wall 23.

In order to provide a means whereby the over or under weight of the commodity platform 44 may be accurately determined, I have provided the pointer 56 which extends outwardly in a narrow housing 57. The housing 57 is formed of front and rear walls 58 and 59 with upper confronting flanges 60 and 61 respectively. The housing sections are secured together by means of bolts 62. The housing 57 is formed at the lower small end thereof with flanges 63 which are secured by fastening means 64 to the top wall 25. A scale member 65 is secured by fastening means 66 to the upper portion of the housing 57 and is provided with a concave lower edge 67 within the concavity of which the point 68 of the pointer 56 is adapted to move. The plate 65 is provided with a central zero mark 69 and with graduations 70 extending from opposite sides of the zero mark 69. The pointer 56 extends loosely through an opening 71 formed in the top wall 25 and the lower end of pointer 56 is secured by fastening means 72 to an upwardly projecting lug 73. The lug 73 has fixed transversely therethrough a pivot member 74 which is of triangular configuration in transverse section and the apex of pivot member 74 is projected downwardly and rockably engages in the upper ends of a pair of supporting members 75. The supporting members 75 extend upwardly from base members 76 secured by fastening means 77 to bosses or flanges 78 carried by base member 16 on opposite side of channel member 20.

The lower ends of the depending studs 41 and 50 are connected together by means of a connecting bar or link 79 which engages in slots 80 formed in the lower ends of studs 41 and 50.

In order to multiply the swinging movement of pointer 56 relative to the scale 65, I have provided a horizontal lever 81 which is fixed by fastening means 82 in a notch 83 formed in the stud 50. The base members or flanges 76 formed integral with the uprights or bearings 75 include second bearings 84 within which triangular studs 85 are adapted to rockably engage. The studs 85 extend from opposite sides of an intermediate lever 86 and lever 86 is adjustably secured to the short end thereof of plate 87 having a triangular bearing member 88 extending right-angularly therefrom. The plate 87 is provided with an elongated slot 89 through which a fastening member 90 engages for securing the plate 87 to the short end of lever 86. A double hooked link 91 engages over stud 88 and also engages over a downwardly directed triangular stud 92 which extends laterally from the inner end of lever 81.

A rock plate 93 is secured to the double hook member 91 so as to prevent jumping of the hooks from the studs 88 and 92. The opposite or long end of the lever 86 has extending laterally therefrom a downwardly directed V-shaped pivot member 94 and the lower hook of a double hook member or link 95 engages beneath the pivot member 94. A lever 96 extends from lug 73 in a direction parallel with lever 86 and an upwardly directed V-shaped pivot member 97 extends laterally from lever 96. The upper hook of double hook member 95 engages over pivot member 97 and a guard plate 98 is fixed to hook member 95 between the upper and lower hooks thereof to prevent the jumping of the hooks of the pivot members 94 and 97. A horizontally extending arm 99 is fixed to the lower end of lug or body 73 and a pointer adjusting weight or balancing member 100 is threaded onto an upstanding bolt 101 carried by the arm 99. The weight 100 provides a means whereby the point 68 may be disposed in registry or alignment with the zero indication 69 of scale 65.

In order to provide a means whereby the movement of balance lever or beam 21 may be cushioned, I have provided a dashpot 102 which is secured to the base member 16. The dashpot 102 includes rod 103 which is secured at its upper end to a forwardly projecting bifurcated lug 104 carried by the bar 28 of beam 21. The rod 103 has threaded thereon a nut 105 which provides a means whereby the beam 21 may be balanced and the downward movement of the weight end of beam 21 may be limited.

In the use and operation of this scale structure the desired weights are placed on the platform 39 and the counterpoise or adjustable weight 53 is adjusted lengthwise of the tare beam 51. The commodity being weighed is placed on platform 44 and when beam 51 is in balance pointer 56 will be disposed with the upper pointed end 68 thereof in alignment with zero graduation 69. In the event the amount of material in the receptacle on platform 44 is over or under the desired weight and quantity, the overage or under weight will be registered by the position of point 68 relative to graduations 70. The rapid movement of the balance beam 21 with tare beam 51 is retarded by means of the dashpot 102. With a scale structure as herein described, the provision of the pointer operating means as hereinbefore described, will provide for the multiplication in the movement of balance beam 21 with respect to pointer 56 so that a very slight under weight or over-weight of the material will be registered in the scale 65. The link or connecting member 79 is pivotally secured in the outer end portion of a bolt or anchor member 106 which is threaded into the bottom of channel 20.

The platform supporting members 38 and 42 are rockably secured between the bars 27 and 28 by means of pivot members 107 engaging in bearings 108 carried by the bars 27 and 28.

What is claimed is:

1. In a balance scale in combination, a base, a housing carried by said base, a balancing beam formed of spaced parallel bars and connecting bars extending between said beams in said housing, a pair of bosses carried at the midpoint of said balancing beams, pivot studs extending outwardly from said bosses, a standard, a bearing carried by said standard engaging said pivot studs, a boss at one end of said housing, a weight platform carrier extending through said boss, a weight platform on said carrier, a commodity platform carrier extending through said housing adjacent the other end thereof, a commodity platform adjacent the other end of said housing, a notched tare beam on the outer side of said housing, means connecting said tare beam and said balance beam, a movable poise weight on said tare beam, a vertically disposed stud carried by said commodity platform, a pointer, a lug pivotally mounting said pointer on said base, a scale adjacent the free end of said pointer, an intermediate lever pivoted on said standard, a horizontal lever carried by said vertically disposed stud, a link connecting one end of said horizontal lever with one end of said intermediate lever, a rock plate carried by said link, a third lever connected to said lug mounting said pointer, and a second link connecting the other end of said intermediate lever with the free end of said third lever.

2. In a balance scale in combination, a base, a housing carried by said base, a balancing beam formed of spaced parallel bars and connecting bars extending between said beams in said housing, a pair of bosses carried at the midpoint of said balancing beams, pivot studs extending outwardly from said bosses, a standard, a bearing carried by said standard engaging said pivot studs, a boss at one end of said housing, a weight platform carrier extending through said boss, a weight platform on said carrier, a commodity platform carrier extending through said housing adjacent the other end thereof, a commodity platform adjacent the other end of said housing, a notched tare beam on the outer side of said housing, means connecting said tare beam and said balance beam, a movable poise weight on said tare beam, a vertically disposed stud carried by said commodity platform, a pointer, a lug pivotally mounting said pointer on said base, a scale adjacent the free end of said pointer, an intermediate lever pivoted on said standard, a horizontal lever carried by said vertically disposed stud, a link connecting one end of said horizontal lever with one end of said intermediate lever, a rock plate carried by said link, a third lever connected to said lug mounting said pointer, a second link connecting the other end of said intermediate lever with the free end of said third lever, and a pointer adjustable weight carried by said lug mounting said pointer.

3. In a balance scale in combination, a base, a housing carried by said base, a balancing beam formed of spaced parallel bars and connecting bars extending between said beams in said housing, a pair of bosses carried at the midpoint of said balancing beams, pivot studs extending outwardly rfom said bosses, a standard, a bearing carried by said standard engaging said pivot studs, a boss at one end of said housing, a weight platform carrier extending through said boss, a weight platform on said carrier, a commodity platform carrier extending through said housing adjacent the other end thereof, a commodity platform adjacent the other end of said housing, a notched tare beam on the outer side of said housing, means connecting said tare beam and said balance beam, a movable poise weight on said tare beam, a vertically disposed stud carried by said commodity platform, a pointer, a lug pivotally mounting said pointer on said base, a scale adjacent the free end of said pointer, an intermediate lever pivoted on said standard, a horizontal lever carried by said vertically disposed stud, a link connecting one end of said horizontal lever with one end of said intermediate lever, a rock plate carried by said link, a third lever connected to said lug mounting said pointer, a second link connecting the other end of said intermediate lever with the free end of said third lever, a pointer adjustable weight carried by said lug mounting said pointer, and a dashpot mounted on said base connected to said balance beam for retarding movement of said balance lever.

References Cited in the file of this patent

UNITED STATES PATENTS

| | | |
|---|---|---|
| 1,645,328 | Hopkinson | Oct. 11, 1927 |
| 2,013,922 | Markham et al. | Sept. 10, 1935 |
| 2,074,983 | Flanagan | Mar. 23, 1937 |
| 2,335,753 | Goodman | Nov. 30, 1943 |